United States Patent [19]

Coate et al.

[11] Patent Number: 5,503,809
[45] Date of Patent: Apr. 2, 1996

[54] COMPACT OZONE GENERATOR

[75] Inventors: Robert B. Coate, Waco, Tex.; John T. Towles, 208 Otis Dr., Waco, Tex. 76710

[73] Assignee: John T. Towles, Waco, Tex.

[21] Appl. No.: 49,567

[22] Filed: Apr. 19, 1993

[51] Int. Cl.$^6$ .................................................. B01J 19/08
[52] U.S. Cl. ........................ 422/186.18; 422/186.07; 422/907; 204/176
[58] Field of Search .................... 422/186.07, 186.18, 422/907; 204/176, 157.44

[56] References Cited

U.S. PATENT DOCUMENTS

| | | | |
|---|---|---|---|
| 788,557 | 5/1905 | Sahlström | 422/186.07 |
| 1,010,777 | 12/1911 | Leggett | 422/186.07 |
| 1,011,503 | 12/1911 | Shepherd | 422/186.07 |
| 3,967,131 | 6/1976 | Slipiec et al. | 250/539 |
| 4,603,031 | 7/1986 | Gelbman | 422/186 |
| 4,770,858 | 9/1988 | Collins | 422/186 |
| 4,774,062 | 9/1988 | Heinemann | 422/186 |
| 4,869,881 | 9/1989 | Collins | 422/186.18 |
| 5,008,087 | 4/1991 | Batchelor | 422/186.22 |
| 5,145,350 | 9/1992 | Dawson et al. | 422/186.15 |
| 5,147,614 | 9/1992 | Conrad | 422/186 |
| 5,169,606 | 12/1992 | Batchelor | 422/186 |
| 5,268,151 | 12/1993 | Reed et al. | 422/186.16 |
| 5,332,556 | 7/1994 | Coakley et al. | 422/186.18 |

Primary Examiner—Donald P. Walsh
Assistant Examiner—Daniel Jenkins
Attorney, Agent, or Firm—Dennis T. Griggs

[57] ABSTRACT

A dual discharge ozone generator has concentrically disposed feed and return tubes including commonly connected inner and outer electrodes and a central electrode radially spaced by first and second spiral spacers forming dual corona discharge chambers.

21 Claims, 3 Drawing Sheets

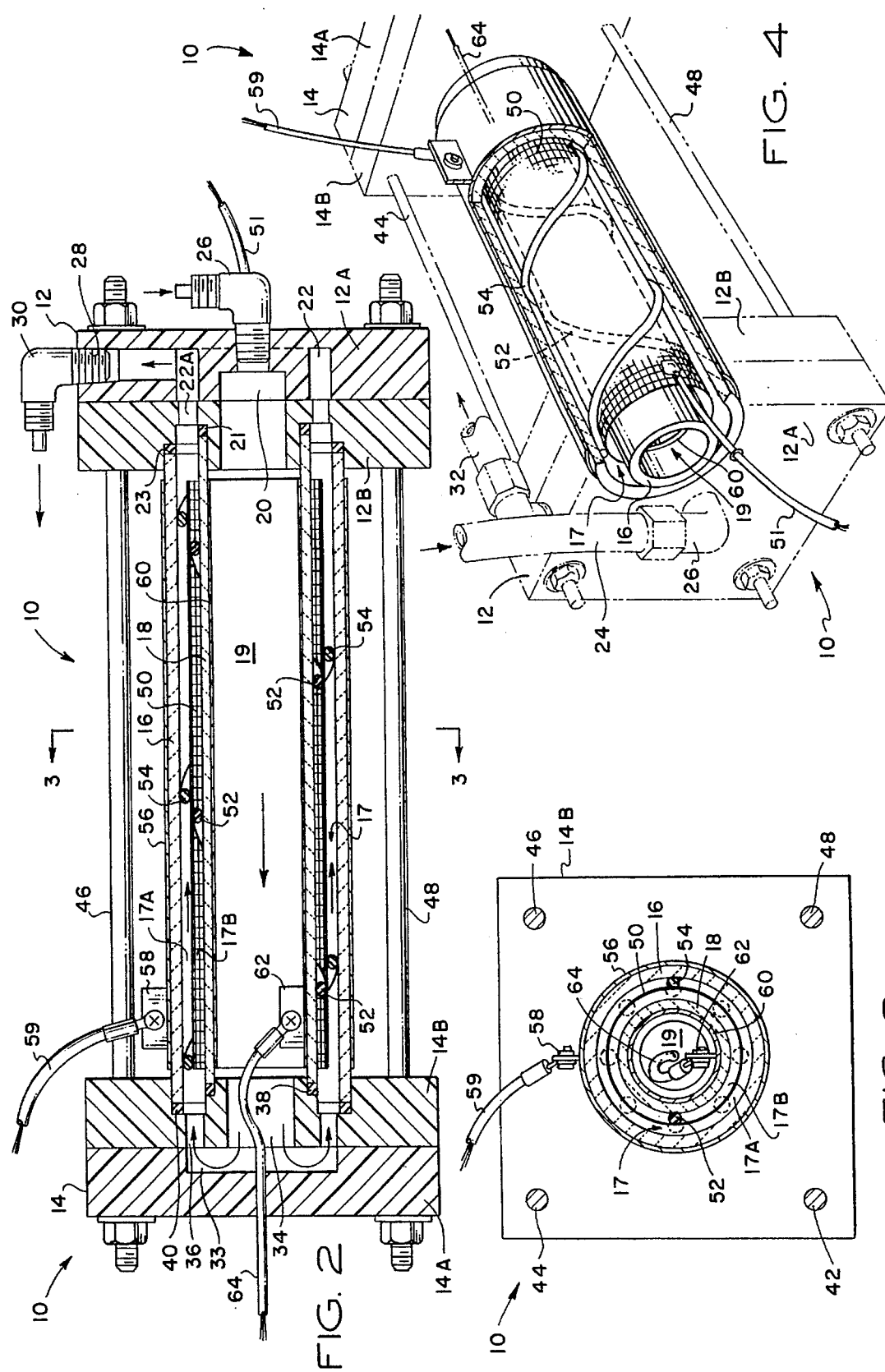

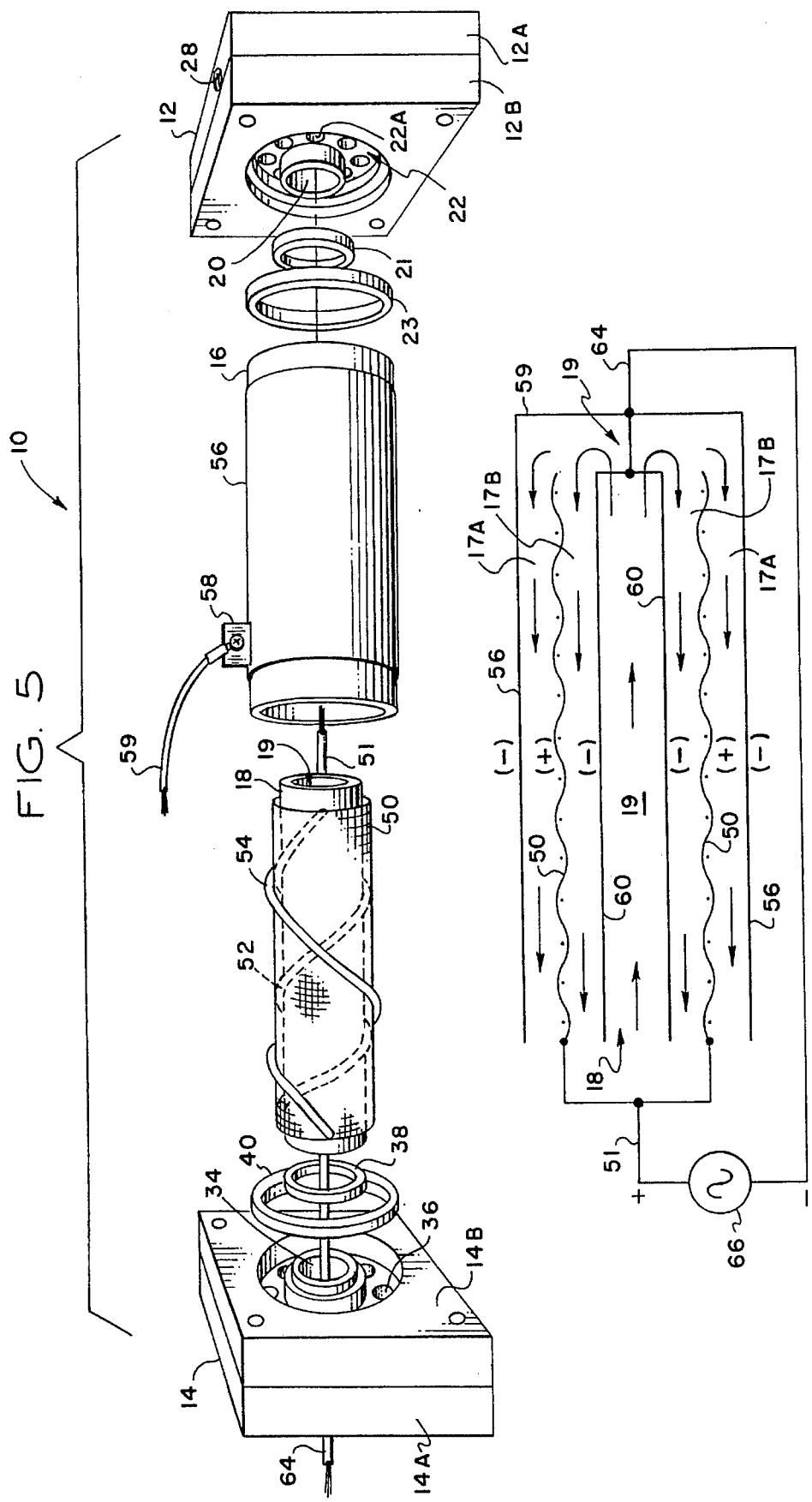

COMPACT OZONE GENERATOR

FIELD OF THE INVENTION

This invention generally relates to the generation of ozone gas from oxygen, and more particularly, to a highly efficient and compact ozone generator.

BACKGROUND OF THE INVENTION

Ozone gas ($O_3$) is a powerful oxidizing agent which is colorless, emits a peculiar odor, and is soluble in water. Ozone gas naturally occurs in the presence of oxygen ($O_2$) during corona discharge such as lightning, or in the stratosphere by the reaction of high-energy ultraviolet radiation on oxygen. In converting oxygen to ozone, energy is absorbed resulting in an endothermic reaction. Ozone therefore has a higher energy content than oxygen. Consequently, ozone is less stable and more active than oxygen.

The oxidizing properties of ozone gas are useful in destroying viruses, bacteria, fungi, and algae. Ozone gas has been used for many years as an excellent water purifying agent. In concentrations of less than one part per million, ozone gas can sterilize water, deodorizes it, and removes certain objectionable impurities such as iron and manganese compounds. Other useful applications for ozone gas include disinfecting sewage, producing metal oxides, bleaching wet paper pulp or textile fibers, and preparation of some complex compounds containing carbon, hydrogen, and oxygen.

DESCRIPTION OF THE PRIOR ART

The most widely used technique for generating ozone gas is to pass dry air or oxygen through a narrow gap between two charged electrodes. The high voltage field across the gap results in a corona discharge which converts a percentage of the gas into ozone gas. Most ozone gas generators are large in size and are designed for industrial applications, requiring many pairs of electrodes.

Small, highly efficiency ozone generators are needed for space sensitive applications such as portable water treatment systems. Moreover, conventional ozone generators usually require water cooling to remove heat generated during the corona discharge process. The use of water cooling is not preferred because of cost, the complexity of manufacturing, the proximity to the high voltage, and the oxidation that occurs in its presence. Furthermore, conventional ozone generators are inefficient in the production of ozone with respect to their size.

There is a continuing interest in providing an efficient and portable ozone generator which is compact, generates ozone at a high percentage, and does not require water cooling.

SUMMARY OF THE INVENTION

A compact ozone generator employing dual corona discharge paths is disclosed having a tubular feed tube concentrically disposed within a tubular return flow tube. An inner electrode is mounted within and along the bore of the feed flow tube. A central electrode is concentrically mounted within the annulus formed between the feed tube and the return tube and is radially spaced therebetween by a first spacer and a second spacer. An outer electrode is mounted externally on and along the length of the return flow tube. A first corona discharge chamber is formed between the inner electrode and the central electrode, with gas flowing therebetween along a path defined by the first spacer. A second corona discharge chamber is formed between the central electrode and the outer electrode, with gas flowing therebetween along a path defined by the second spacer. A counterflow manifold couples the distal ends of the feed and return flow tubes together and directs the supply gas through the first and the second corona discharge chambers.

ADVANTAGES OF THE INVENTION

The use of three concentrically arranged electrodes in a dual discharge path arrangement provides double firing (i.e. inside and outside the central electrode disposed within the airflow annulus) thus increasing the percentage of generated ozone.

Another advantage of the present invention is that the paths defined by the first and second spacers direct the gas flow into the corona discharge while maintaining a uniform laminar airflow.

Yet another advantage of the present invention is that the counterflow design of the air path provides a compact and efficient package which reduces the need for cooling.

BRIEF DESCRIPTION OF THE DRAWINGS

Referring now to the drawings in which like reference numerals and letters indicate corresponding elements throughout the several views:

FIG. 2 is a side sectional view taken approximately along the line 2—2 in FIG. 1;

FIG. 3 is a longitudinal sectional view taken approximately along the line 3—3 in FIG. 2;

FIG. 4 is a second cutaway perspective view of the ozone generator for illustrating other aspects of the present invention;

FIG. 5 is an exploded view of the compact ozone generator depicted FIG. 1; and,

FIG. 6 is a schematic diagram of a dual corona discharge circuit constructed according to the principles of the present invention.

DETAILED DESCRIPTION OF THE PREFERRED EMBODIMENT

Figure 1:
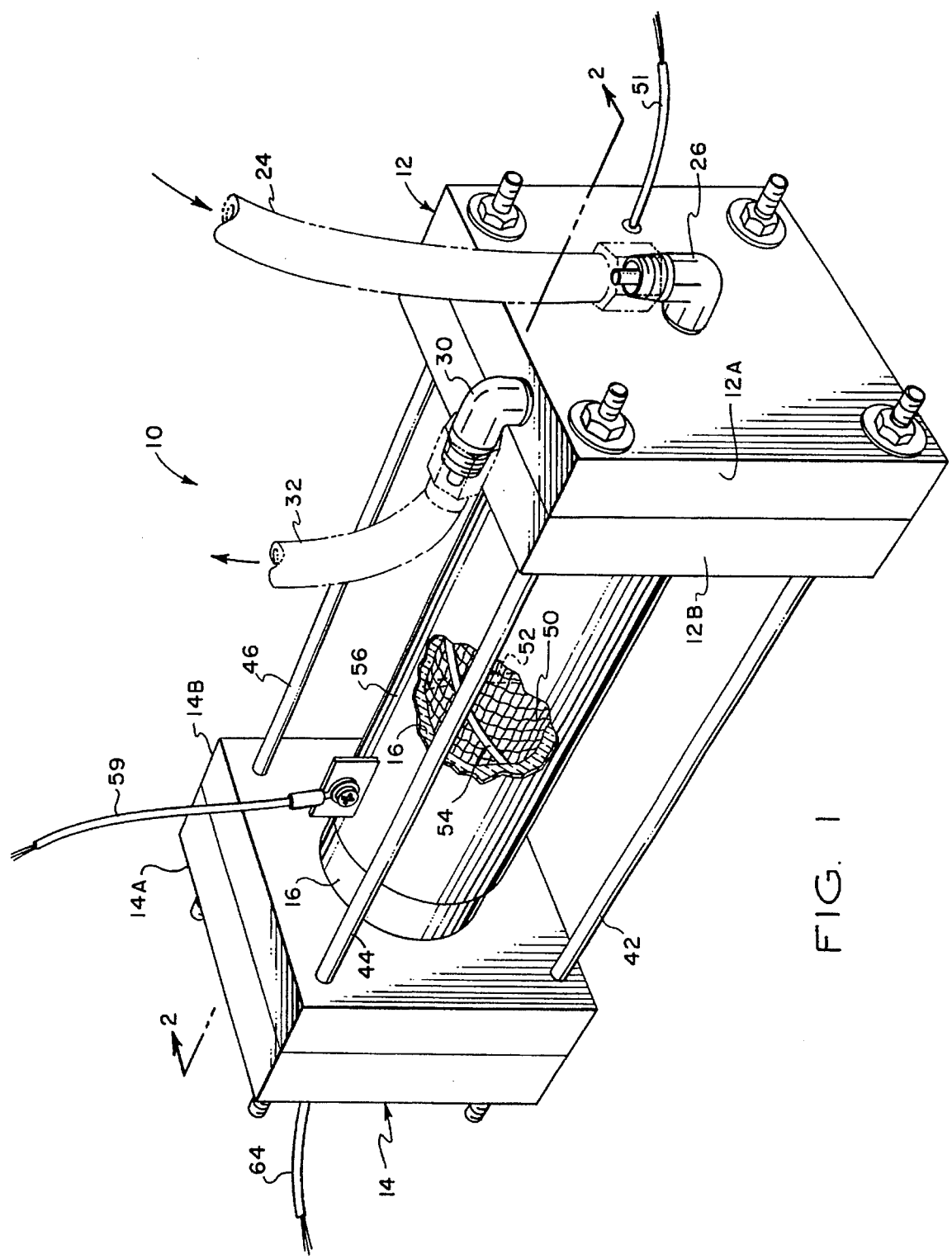
FIG. 1 is a cutaway perspective view of an ozone generator constructed according to the principles of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the spirit and scope of the present invention.

Referring now to FIGS. 1 and 5, a compact ozone generator 10 includes a first end block 12 and a second end block 14 which are disposed at proximal and distal ends respectively, for supporting an outer tube 16 and a concentrically disposed inner tube 18. The inner tube 18 has a longitudinal bore defining an inlet flow passage 19. The outer tube 16 and the concentrically disposed inner tube 18 define an annular flow passage therebetween and spanning their length. The first end block 12 and the second end block 14 are preferably made of a non-conductive, ozone resistant material such as PVC or PTFE, commonly referred to by its trade name TEFLON®. The outer tube 16 and the inner tube 18 are preferably made of a dielectric and thermally conductive material such as an aluminate ceramic, which is also ozone resistant. While the first and second end blocks 12 and 14 may be unitary pieces, each is preferably constructed in two mating block portions which are secured together by an ozone resistant epoxy to facilitate assembly.

The first end block 12 includes first and second mating block portions 12A, 12B which are intersected by an intake manifold chamber 20 and an exhaust manifold chamber 22, respectively (FIG. 5). The intake manifold chamber 20 is coupled to a source of feed gas (for example oxygen) and extends outwardly and concentric to the proximal end of the inner tube 18. The intake manifold chamber 20 has an outer diameter substantially equal to the inner diameter of the inner tube 18. The exhaust manifold chamber 22 includes a plurality of ducts 22A coupled together in communication with a single exhaust port 28 and has a periphery forming a recessed diameter substantially equal to the outer diameter of the outer tube 16. A first O-ring 21 is disposed over the outer diameter of the intake manifold 20 for making an air-tight seal when the intake manifold 20 is operatively engaged with the proximal end of the inner tube 18. Likewise, a second O-ring 23 is disposed within the diameter formed by the exhaust manifold 22 for making an air-tight seal when the proximal end of the outer tube 16 is operatively engaged.

A source of feed gas containing oxygen (not shown) is coupled to the inlet flow passage 19 through an air intake hose 24 to an air intake coupling 26 coupled to the intake manifold 20. The flow of the feed gas through the inlet flow passage 19 is set by fixed orifice size or by a variable needle valve flow meter. The flow is set to a maximum flow rate while maintaining a proper retention time in the spiral corona discharge paths 17A, 17B, discussed in more detail hereinbelow. The feed gas may be in the form of bottled oxygen, oxygen dried air from a compressor or ambient air drawn through a dissicant drier material. With the latter type of feed gas there will be a reduction in the percent by weight of ozone production.

The feed gas is preferably chilled before entering the inner tube 18 to aid in cooling the corona discharge chambers. Additional cooling may also be provided by external fans (not shown) mounted adjacent the outer tube 16. An exhaust coupling 30 is screwed into the exhaust port 28 for coupling an exhaust hose 32 thereto. It is to be understood that multiple generators 10 may be coupled together at the exhaust port 28 in order to increase the volume of ozone gas. The intake coupling 26 and the exhaust coupling 30 are preferably made of ¼ inch stainless steel or brass tubing with ⅛ inch NPT threads for connection with the air intake hose 24 and the exhaust hose 32.

The second end block 14 includes first and second block portions 14A, 14B which are intersected by bores and counterbores which form a counterflow manifold chamber 33 including an intake duct 34 having an outer diameter substantially equal to the inner diameter of the inner tube 16, and a plurality of recessed exhaust ducts 36. A third O-ring 38 is disposed over the outer diameter of the intake duct 34 for making an air-tight seal where the intake duct 34 is operatively engaged within the distal end of the inner tube 18. Likewise, a fourth O-ring 40 is disposed within the circumference formed by the recessed exhaust ducts 36 for making an air-tight seal when the distal end of the outer tube 16 is operatively engaged. These "O" rings are Quad rings and should be constructed of an ozone resistant material such as VITON (Trade name) material.

The first end block 12 and the second end block 14 snugly hold the outer tube 16 and the inner tube 18 concentric with the aid of four threaded stainless steel bolts 42, 44, 46, and 48 which engage respective washers and nuts on both ends.

A screen grid electrode 50 (anode) is concentrically disposed around the inner tube 18 and within the outer tube 16 and spaced therefrom by a first monofilament strand 52 and a second monofilament strand 54 respectively. In the preferred embodiment, the screen grid 50 is made of an alloy of titanium and stainless steel with each of the cross points in the screen grid 50 constituting a separate corona discharge point. A wire conductor 51 is attached to the screen grid 50 and is routed through a bore in first end block 12.

The first spacer strand 52 and the second spacer strand 54 are preferably made of a non-conductive natural or synthetic material such as nylon polymer monofilament and are helically wound in opposite directions (i.e. clockwise and counterclockwise directions) along the length of the tubes 16 and 18. As can be best seen in FIG. 1 and FIG. 4, the helically wound strands 52 and 54 define complementary swirling inner and outer chambers 17A, 17B in and about screen grid electrode 50 and within the annulus 17 formed between the inner tube 18 and the outer tube 16. The swirling chambers 17A, 17B urge feed gas into the path of corona discharge between the dual electrode arrangement while maintaining substantially laminar flow.

The outer tube 16 has an electrically conductive layer disposed on its outer diameter forming an outer electrode 56 (first cathode). The outer electrode 56 is a metal film or foil preferably of stainless steel, formed or affixed to the outer diameter of the outer tube 16. The outer electrode 56 includes a conductive flange 58 for attachment to a wire 59. The inner tube 18 has an electrically conductive layer (best seen in FIG. 3) disposed on its inner diameter forming an inner electrode 60 (second cathode). The inner electrode 60 is a metal film or foil preferably of stainless steel, formed or affixed to inner diameter of the inner tube 16. The inner electrode 60 includes a flange 62 for attachment to a wire 64. The wire 64 is routed through a bore in the second end block 14. It should be understood that many expedients are known for applying a metallic film surface (i.e. electrodes 56 and 60) to a dielectric material such as ceramic, the exact materials and process of applying same not being required for the understanding and practice of the present invention.

As shown in FIGS. 2, 3 and 6, a first corona discharge path is defined between the inner electrode 60, through the dielectric material forming the wall of inner tube 18, across the first swirling flow chamber 17A formed by the monofilament spacer strand 52, to the screen grid electrode 50. Similarly, a second corona discharge path is defined between the outer electrode 56 through the dielectric material forming the wall of the outer tube 16, across the second swirling flow chamber 17B formed by the monofilament strand 54, to the screen grid electrode 50.

Referring again to FIG. 6, dual corona discharge occurs between electrodes 56 and 50 and between electrodes 60 and 50. Feed gas flows through the inlet flow passage 19 of the inner tube 18 to its distal end. The gas is then redirected back through the first and the second spiral flow paths 17A and 17B defined by the strands 52 and 54.

The inner and outer electrodes 60 and 56 are connected together via wire conductors 64 and 59 and to one end of a voltage source 66. The other end of the voltage source 66 is connected to the screen grid electrode 50 via wire 51. The voltage source 66 preferably has a frequency of 400 Hz or more and an amplitude of 4,000 volts or more to produce corona discharge through the feed gas. It should be understood that other frequencies and amplitudes may be used without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An ozone generator comprising:

a feed tube having a bore defining an inner flow passage therethrough and having an inner electrode mounted thereon;

a return tube concentrically disposed about the feed tube and forming an annular flow passage therebetween, the return tube having an outer surface and having an outer electrode mounted thereon;

end means coupling the inner flow passage in flow communication with the annular flow passage; and, a central electrode disposed within the annular flow passage and radially spaced from the feed tube and the return tube.

2. An ozone generator as defined in claim 1, including:

spacer means disposed within the annular flow passage for radially spacing the central electrode between the feed tube and the return tube.

3. An ozone generator as recited in claim 2 wherein the spacer means forms a first spiral flow passage and a second spiral flow passage spanning the feed and return tubes.

4. An ozone generator as recited in claim 2 wherein the spacer means comprise first and second monofilament strands of natural or synthetic fibers respectively.

5. An ozone generator as recited in claim 4 wherein the first spacer strand and the second spacer strand are wound in opposite directions along spiral paths.

6. An ozone generator as recited in claim 5 wherein the first spacer strand and the second spacer strand are each wound at a pitch to urge gas flow along separate flow passages between the inner and the central electrodes and between the outer and the central electrodes, respectively.

7. An ozone generator as recited in claim 1 wherein the inner electrode is a thin stainless steel tubular layer.

8. An ozone generator as recited in claim 1 wherein the outer electrode is a thin stainless steel tubular layer.

9. An ozone generator as recited in claim 1 wherein the central electrode is a tubular screen constructed of a conductive metal mesh material.

10. An ozone generator as recited in claim 9 wherein the metallic mesh screen comprises an alloy of titanium and stainless steel.

11. An ozone generator as recited in claim 1 wherein the feed tube and the return tube are made of a dielectric material.

12. An ozone generator as recited in claim 11 wherein the dielectric material is ceramic.

13. An ozone generator having a dual corona discharge chamber, comprising:

an inner dielectric tube;

an inner electrode disposed within the inner dielectric tube having a proximal end and a distal end;

a screen electrode disposed coaxially around the inner dielectric tube and spaced therefrom by a first spacer;

an outer dielectric tube;

an outer electrode disposed on an outer surface of the outer dielectric tube having a proximal and a distal end, outer dielectric tube being disposed coaxially around the screen grid electrode and spaced therefrom by a second spacer; and, a first end block having a pocket for receiving the distal ends of the inner and the outer dielectric tubes, and having flow passages for coupling a volume of gas traveling from the proximal end of the inner tube and directing the gas through a first flow passage bounded by the first spacer and a second flow passage bounded by the second spacer to an exhaust outlet on the proximal end of the outer tube.

14. An ozone generator as recited in claim 13 wherein the first spacer and the second spacer each comprise a strand of dielectric material wound in spiral relation about an axis coaxially with the feed and the return tubes.

15. An ozone generator as recited in claim 14 wherein the first and the second spacer strands are wound in opposite directions.

16. An ozone generator as recited in claim 13 wherein the first and the second spacers each comprise a monofilament strand.

17. An ozone generator as recited in claim 13 wherein the volume of gas is first chilled before entering the proximal end of the inner tube.

18. A method for generating ozone comprising the steps of:

providing a gas flow passage between a first electrode and a second electrode;

partitioning the gas flow passage with a third electrode, thereby defining a first current discharge space between the first electrode and the third electrode and defining a second current discharge space between the second electrode and the third electrode;

feeding a volume of gas containing oxygen through the first current discharge space and through the second current discharge space; and, applying a voltage to at least one of the electrodes and to the second electrode at an amplitude sufficient to induce electrical current flow through the first discharge space between the first electrode and the third electrode and through the second discharge space between the second electrode and the third electrode as the gas flows through the first and second discharge spaces.

19. A method as recited in claim 18 further comprising the step of swirling the gas through the discharge spaces so that the contact between the gas and the third electrode is increased.

20. A method as recited in claim 19 wherein the step of swirling the gas further includes swirling the gas along first and second helical paths which turn in opposite directions through the discharge passage.

21. An ozone generator comprising:

a feed tube having a longitudinal bore defining an inner flow passage;

a first electrode mounted on the feed tube;

a return tube disposed around the feed tube and defining an annular flow passage therebetween;

a second electrode mounted on the return tube;

end means coupling the inner flow passage in flow communication with the annular flow passage; and, a third electrode disposed within the annular flow passage and positioned between the first electrode and the second electrode.

* * * * *